United States Patent Office 2,725,309
Patented Nov. 29, 1955

2,725,309

COATED NON-WOVEN FABRIC AND METHOD OF MAKING

Ernest A. Rodman, Newburgh, N. Y., assignor to E. I. du Pont de Nemours & Company, Wilmington, Del., a corporation of Delaware No Drawing. Application June 18, 1951,
Serial No. 232,247

14 Claims. (Cl. 117—73)

This invention relates to the production of coated fabrics, particularly to such fabrics which are adapted for use where high strength and absence of a weave pattern are desired and more particularly to coated non-woven fabrics.

Filaments have been made from a large variety of materials, such as, e. g. cellulose acetate, viscose, copolymers of vinyl chloride and vinyl acetate, polyvinylidene chloride, copolymers of vinylidene chloride and acrylonitrile, nylon, glass, acrylic polymers and many others. These synthetic polymers have been mixed with each other and various natural fibers, such as cotton, wool and silk to produce both woven and non-woven fabrics for a great many uses.

When woven fabrics are used for certain applications such as a base or substrate for flexible coatings in the manufacture of upholstery, pocketbooks, and artificial leather in general the fabric weave pattern shows through the surface coatings and is generally undesirable. Many attempts have been made to overcome this undesirable characteristic of coated woven fabrics. The use of felts or nonwoven fabrics made from various fibers and fiber combinations has been tried many times as a substrate for flexible coatings in the manufacture of various artificial leather products. The non-woven fabrics produced heretofore for this purpose have lacked sufficient tensile and tear strength or are too stiff and boardy to be of any appreciable value. Also the felts or non-woven fabrics available heretofore for this purpose have resulted in a very uneven coated surface such as an exaggerated orange peel effect.

An object of this invention is the production of coated non-woven fabrics which have greatly improved physical properties. A more specific object is the production of a coated non-woven fabric having improved tensile and tear strength. A still further object is the production of a coated non-woven fabric suitable for upholstery materials. Another object is the production of a coated fabric, the surface of which is free from pattern effects resulting from the fabric substrate.

These and other important objects are accomplished according to the present invention by coating and/or impregnating one or both sides of a non-woven fabric comprising non-fusible or relatively non-fusible fibers, which form the fabric structure, bonded together by means of certain fusible elastic polyesters defined more fully hereinafter. The relatively non-fusible fibers may consist of cotton, nylon, viscose rayon, cellulose acetate, polyethylene terephthalate, polymers of acrylonitrile, copolymers containing at least 85% acrylonitrile, wool, glass and mixtures thereof.

The term "non-fusible" or "relatively non-fusible" as used throughout the specification and appended claims refers to a structural fiber whose fusion temperature and temperature at which adhesiveness develops is higher than the fusible polyester, referred to hereinafter as the binder. The differential in the temperature at which the structural fiber and the binder develop adhesive properties should preferably be about 50° F. for commercial operations. Under certain controlled conditions this temperature differential may be less than about 50° F.

The copolyesters employed for the fusible or binding material are similar to those prepared by copolymerizing under melt polymerization conditions and within certain composition limits hereinafter set forth, at least one acyclic dicarboxylic acid of the formula

HOOC—CH₂XCH₂—COOH wherein X is a linear chain composed of 4 to 9 atoms, in the chain of which not more than three may be oxygen atoms and the remaining are hydrocarbon carbon atoms, any two such oxygen atoms being separated by at least two such carbon atoms, the hydrocarbon carbon atoms being saturated and containing a total of not more than three hydrocarbon carbon atoms as side chain substituents, with at least one symmetrical aromatic dibasic acid from the group consisting of terephthalic acid, bibenzoic acid, ethylene bis p-oxy-benzoic acid, tetramethylene bis p-oxy-benzoic acid, and 2,6-naphthalic acid and with a polymethylene glycol of the formula

HO(CH₂)ₙOH wherein n is a whole number from 2 to 6 inclusive. Fibers prepared from these copolyesters by the conventional melt or solvent spinning technique exhibit an elastic recovery, after orientation by cold drawing, of the order of 90% or better within one minute after an extension of 100%. The copolymers per se are the invention of Mark D. Snyder and are disclosed and claimed in copending application Serial No. 150,811, filed March 20, 1950, now U. S. Patent 2,623,033.

The relative amounts of aliphatic and aromatic acids to be used are critical in preparing the copolyesters, since if too much of either one is used the copolyester tends to be too crystalline to produce highly elastic polymers. Therefore, to make the elastic copolyester, it is necessary that the aromatic acid reactant comprise at least 30% and not more than 70% by weight of the total acid reacted with polymethylene glycol to form the final polymer. A preferred range is 55–65% of the aromatic acid. It is a simple matter to obtain any desired ratio of acid components in any one copolyester. The acids will be present in the final polymer in the same ratio as they were present in the initial reactants, provided an excess of glycol is used. It should be understood, of course, that many combinations of these aliphatic and aromatic acids may be used. Thus, two or more aliphatic and/or two or more aromatic acids may be used to form the copolyester. It is also to be understood that the ester-forming derivatives of these acids can be used in place of, and are the full equivalents of the acids described above as is generally the case in the manufacture of linear polyesters.

In addition to the copolyesters described above and disclosed in copending application Serial No. 150,811, the melt mixtures of polyesters and copolyesters described in copending application Serial No. 150,812, filed March 20, 1950, by M. D. Snyder, now U. S. Patent 2,623,031, may also be used as the binding medium for the non-fusible structural fibers. The melt-blends are prepared by first preparing the copolyester described above and thereafter melt-blending the copolyester thus formed with an aromatic polyester prepared by melt polymerizing a symmetrical aromatic dibasic acid from the group consisting of terephthalic acid, bibenzoic acid, tetramethylene bis p-oxy-benzoic acid, and 2,6-naphthalic acid, and a polymethylene glycol of the formula HO(CH₂)ₙOH, n being a whole number from 2 to 6 inclusive. Preferably, the same aromatic dibasic acid used in the copolyester is used in the polyester. As in the case of the copolyester the aromatic acid component of the melt-blend of the polyester and copolyester should be at least 30% and not more than 70% on a weight basis.

A preferred embodiment of this invention is carried out by applying a polyvinyl chloride coating to non-woven fabrics prepared by intermingling non-fusible structural fibers such as cotton, viscose rayon, cellulose acetate, nylon, polyethylene terephthalate, polymers of acrylonitrile, copolymers containing at least 85% acrylonitrile, wool and glass, with the polyester fibers described above. The blending of the fibers is carried out mechanically or manually in accordance with well established procedures in the textile art. An alternate method is to introduce the copolyester binder in the form of a solution into a preformed mat of structural fibers which permeates the fibers and binds them together upon evaporation of the solvent. Another alternate method is to distribute the polyester binder throughout the assembly of preformed bats of structural fiber in the form of finely divided particles and then activating the adhesive properties of the polyester by subjecting the assembly to heat and pressure and/or by treatment with a solvent for the polyester. Still another alternate method is to introduce the binder throughout the structural fiber mat in the form of an aqueous suspension which may be fused or dissolved after drying by subjecting the impregnated mat to heat and pressure and/or a solvent for the binder.

In the preferred practice a plurality of the loosely bound webs from the card or other mat forming equipment are superposed in parallel arrangement or they may be crosslapped at right or acute angles. The superposed webs are then subjected to heat and pressure by passing between heated calender rolls under pressure or pressed between heated plates. The heat required must be sufficient to render the polyester fiber adhesive and have no appreciable effect on the relatively non-fusible or structural fibers. In actual practice a plurality of single webs from the card are superposed in parallel arrangement or alternately crosslapped in a manner well known in the art of felt making.

The non-woven fabric per se is disclosed and claimed in a copending application S. N. 232,245 filed June 18, 1951 by J. A. Piccard, now Patent No. 2,676,128.

The following specific examples are given by the way of illustration and not limitation.

*Example I*

Monofilaments were prepared by melt spinning a copolyester consisting of 40 parts by weight of ethylene glycol sebacate per 60 parts by weight of ethylene glycol terephthalate. The copolyester had a fusion temperature of approximately 320° F. The copolyester fiber was cut into staple of approximately 1½ inch length. After this staple was opened it was thoroughly mixed with a long staple cotton fiber of approximately 1 1/16 inch length in the ratio of 2 parts by weight of cotton to 1 part by weight of copolyester. This mixture was then carded in the form of a web weighing approximately .66 ounce per square yard in a fashion usually employed in the manufacture of non-woven fabrics. Twelve separate webs were superposed in such a manner that alternate sets of four parallel webs were crosslapped at substantially right angles. The entire assembly was pressed for one minute between the platens of a hydraulic press at a temperature of 365° F. and at a pressure of 400 p. s. i. The felt produced was 15 to 20 mils thick and weighed approximately 8.0 ounces per square yard and had the following physical properties:

|  | W x F [1] |
|---|---|
| Tensile strength (1" strip)[2] | 25 lbs. x 43 lbs. |
| Tongue tear [2] | 3.7 lbs. x 4.7 lbs. |
| Percent elongation to breaking point [2] | 10% x 13% |

[1] The letters "W" and "F" refer to the conventional warp and filler direction of woven fabrics. In this instance and hereinafter the "W" refers to the machine direction of the non-woven fabric and the "F" refers to the cross-machine direction.

[2] In this and succeeding examples the tensile strength, tongue tear and elongation tests were carried out in accordance with the procedures described in ASTM, D-39-49.

The copolyester referred to above may be prepared in accordance with the disclosure in copending application Serial No. 150,811, filed March 20, 1950.

To one side of the above described non-woven fabric is applied the following composition:

| | Percent by weight |
|---|---|
| Polyvinyl chloride dry powder | 52.45 |
| Dioctyl phthalate | 32.55 |
| Pigments and fillers | 15.00 |
| | 100.00 |

The above composition is prepared by dispersing the pigments and fillers in the dioctyl phthalate, and the dry polyvinyl chloride powder is dispersed in the pigment-plasticizer dispersion to form a paste-like plastisol coating. This coating is spread on one side of the above described non-woven fabric by means of a doctor knife. The amount of coating applied may vary over a wide range. For upholstery uses about 15 to 20 ounces per square yard may be applied in a single coat after which the coated fabric is subjected to a heat treatment to fuse or coalesce the polyvinyl chloride-pigment-plasticizer mixture by the solvent action of the plasticer on the resin at the elevated temperature. Upon cooling a tough, flexible and strongly adherent coating is obtained. For certain uses the coated fabric is further processed by embossing the coating with a decorative grain by pressing between heated rolls or plates, one of which has a design engraved on its surface. In certain cases it is desirable to heat the coated fabric until it is softened and then pressing or rolling with unheated rolls or plates.

The coated fabric is resistant to tearing and forms easily over irregular shaped surfaces as are encountered in furniture upholstering. When the coated fabric is stretched over an irregular shaped surface, such as the corner of a chair, it maintains a smooth surface due to the absence of a fabric weave pattern in the substrate.

*Example II*

A non-woven fabric was prepared in the same manner as described in Example I in which the structural fiber (non-binding) was 3.0 denier nylon monofilament staple approximately 1½ inches long. Three parts by weight of this staple were mixed with one part by weight of the copolyester staple fiber referred to in Example I. The mixed staples were carded and formed into a web. Twelve separate webs in which alternate sets of four parallel webs were crosslapped, and compacted by passing between calender rolls heated to 265° F. at a rate of 6 ft. per minute, with the calender rolls opened to 4 mils. The resulting felt was approximately 8.0 ounces/square yd., 16 mils thick and had the following physical properties:

|  | W x F |
|---|---|
| Tensile strength (1" strip) | 67 x 88 lbs. |
| Tear strength (tongue) | 27 x 31 lbs. |
| Percent elongation to breaking point | 75 x 80% |

The substrate was soft, smooth and pliable.

The nylon polymer in the above example is a synthetic linear polyamide resulting from the reaction of hexamethylene diamine and adipic acid and may be produced in accordance with the teaching in U. S. Patents 2,071,250 and 2,071,251.

The above described substrate was calender coated with the following composition:

| | Parts by weight |
|---|---|
| Copolymer of vinyl chloride (95) and vinyl acetate (5) | 100.0 |
| Dioctyl phthalate | 63.0 |
| Calcium carbonate | 15.0 |
| Pigments | 5.0 |
| Lead stearate | 1.2 |
| Heat stabilizer (coprecipitate of lead ortho silicate and silica gel) | 4.0 |

The above calender composition was prepared in a well known manner by mastication on a two-roll rubber mill or Banbury mixer and while hot, calendered onto the substrate in the form of a film 12 mils thick. The coated fabric was embossed in a conventional manner to decorate the surface. The coated fabric had the following physical properties:

|  | W x F |
|---|---|
| Tensile strength (1" strip) | 84 x 94 lbs. |
| Tear strength (tongue) | 29 x 24 lbs. |
| Percent elongation to breaking point | 75 x 95% |
| Total weight (substrate plus coating) | 18.3 oz./sq. yd. |

The coated fabric was suitable for use as heavy duty upholstery and being free of fabric weave pattern had the appearance of unsupported film. The tear strength and percent elongation to the breaking point obtained in this example is not attainable with the prior art coated non-woven fabrics. The high percent elongation to the breaking point makes this product highly desirable in upholstering where it is necessary to stretch the material over curved uneven or irregular surfaces.

*Example III*

A non-woven fabric was produced in the same manner as described in Example II except the relatively non-fusible structural fiber was a polyester of ethylene glycol and terephthalic acid and nine separate webs were employed in crosslapped relation. The binding fiber was the copolyester referred to in Example I. Three parts by weight of the polyester fiber were blended with one part by weight of copolyester fiber. The compacting was carried out by calendering in the same manner as described in Example II. The non-woven fabric weighed approximately 8.0 ounces/square yard and was soft and flexible and had the following physical properties:

|  | W x F |
|---|---|
| Tensile strength (1" strip) | 62 x 64 lbs. |
| Tongue tear | 16 x 28 lbs. |
| Percent elongation to breaking point | 58 x 58% |

The polyethylene terephthalate may be produced in accordance with the disclosure in U. S. Patent 2,465,319.

To the above described non-woven fabric is applied the following composition:

|  | Percent by weight |
|---|---|
| Polyvinyl chloride | 11.5 |
| Polypropylene sebacate | 7.7 |
| Pigments and filler | 10.3 |
| Methyl ethyl ketone | 70.5 |

The above composition is prepared in a well known manner by first dissolving the resin in hot (approximately 140° F.) methyl ethyl ketone. The pigments and filler are separately dispersed in the polypropylene sebacate and then mixing the resin solution with pigment-plasticizer mixture. The composition is maintained at about 100–120° F. Sufficient composition is applied by means of a doctor knife in a plurality of coats to deposit approximately 4.0 ounces of non-volatile components per square yard. The coated fabric is passed through a heated zone after each successive coat to volatilize the methyl ethyl ketone.

The methyl ethyl ketone has a slight solvent action on the copolyester binder in the substrate which promotes the cementing action of the binder fiber to the structural fiber and adhesion of the surface coating to the substrate. The amount of solvent action of the methyl ethyl ketone on the substrate is insufficient to appreciably stiffen or reduce the tear strength of the coated fabric.

The product was soft, flexible, elastic, abrasion resistant and useful for upholstery, case covering pocketbooks, and wherever high strength coated fabrics are required.

*Example IV*

A non-woven fabric similar to Example II was calender coated on each side with the following composition:

|  | Parts by weight |
|---|---|
| Neoprene | 240.00 |
| Paracoumarone-indene resin | 9.75 |
| Magnesium oxide | 9.75 |
| Carbon black | 156.00 |
| Phenyl beta naphthylamine | 4.88 |
| Stearic acid | 2.44 |
| Petroleum oil | 14.25 |
| Barytes filler | 240.00 |
| Sulfurized oil | 91.13 |
| Zinc oxide | 12.00 |

The above composition was prepared by mixing on a two-roll rubber mill in a well known manner. The zinc oxide is added at the end of the mixing cycle to prevent premature curing. The milled compound was calendered onto each side of the fabric to a total thickness of 36 mils. The coating was distributed approximately equally on each side. The coated fabric was brought up to a temperature of 260° F. in one hour and held at that temperature for two additional hours to cure the coating and then cooled to room temperature.

The coated fabric was flexible, tough, abrasion resistant and was useful for industrial gaskets.

*Example V*

A non-woven fabric was produced by carding nylon fiber (1½" staple—3.0 denier) to form a web. Alternate sets of four webs were crosslapped to form a bat. The bat was compacted by passing between smooth pressure rolls. The bat at this stage weighed 6.0 ounces per square yard. The bat was dipped into 3% solution of the copolyester (described in Example I) in chloroform and the excess squeezed out between pressure rolls. The wet web was next dipped in ethanol which precipitated the copolyester on the structural nylon fibers throughout the bat. The bat was dried at 250° F. and then was further compacted by passing between heated (265° F.) pressure rolls. The product obtained weighed 7.9 ounces per square yard and had the following physical properties:

|  | W x F |
|---|---|
| Tensile strength (1" strip) | 75 x 115 lbs. |
| Tongue tear | 15 x 33 lbs. |

To the above described non-woven fabric is applied the same coating and same amount as described in Example I. The coated fabric is useful where high strength, good dimensional stability and resistance to abrasion are required. The uncoated side of the fabric is more resistant to abrasion than the non-woven fabrics employing the binder in the form of a fiber.

*Example VI*

A non-woven felt-like fabric was produced by blending the following fibers:

|  | Part by weight |
|---|---|
| Nylon (1½" staple—3.0 denier) | 1 |
| Polyester of ethylene glycol and terephthalic acid (1½" staple—3.0 denier) | 1 |
| Copolyester of 60 parts ethylene glycol terephthalate and 40 parts ethylene glycol sebacate (1½" staple—3.0 denier) | 1 |

The blended fibers were carded in the form of a web weighing about ¾ ounce per square yard. Twelve separate webs were superposed, the first four webs in parallel arrangement, the second four in parallel arrangement and at right angles to the first four and the third four were in parallel arrangement and at right angles to the second four. The composite assembly was compacted by passing between even speed high pressure rolls heated to about 265° F. and set about 4 mils apart.

The assembly was compacted to approximately 15 mils thick and weighed approximately 8.0 ounces per square yard. The felt-like material had the following physical properties:

|  | W x F |
|---|---|
| Tongue tear | 31 x 31 lbs. |
| Tensile strength (1" strip) | 74 x 50 lbs. |
| Per cent elongation to breaking point | 75% x 75% |

To one side of the above described non-woven fabric is applied the following composition:

|  | Per cent by weight |
|---|---|
| Nitrocellulose | 15.8 |
| Ethyl alcohol | 23.7 |
| Ethyl acetate | 23.7 |
| Pigments | 13.2 |
| Castor oil | 23.6 |
|  | 100.0 |

The above composition is prepared in a well known manner and applied to the above described non-woven fabric in a plurality of coats by means of a doctor knife, with forced drying between each coat. Sufficient coating was applied in a plurality of coats to deposit approximately 8.0 ounces per square yard of non-volatile components. The coated fabric may be further processed by the application of decorative finishing coats and/or embossing.

The coated fabric has unusually high resistance to tear and is useful for upholstery, loose leaf notebook covers, pocketbooks, card table covers, footwear and wherever high strength coated fabrics are required.

*Example VII*

A non-woven fabric was produced by blending 3 parts by weight of 1½" nylon staple (3.0 denier) with 1 part by weight of the copolyester referred to in Example I. The mixed fibers were carded into a web. Six webs were arranged with alternate sets of two webs in crosslapped relation. The six webs were compacted between heated rolls at 265° F. to form a non-woven fabric.

The non-woven fabric was coated on each side with the following priming composition:

| Part A—Mill mixed: | Parts by weight |
|---|---|
| Neoprene | 100.00 |
| Accelerator-piperindium pentamethylene dithio carbamate | .25 |
| Magnesium oxide | 4.00 |
| Part B—Dissolve Part A in Part B: |  |
| Toluol | 450.00 |
| Part C—Add just prior to application: |  |
| 50% solution of methylene diphenyl diisocyanate in aromatic solvent | 25.00 |

One doctor knife application of the above composition was applied on each side of the above described non-woven fabric. The coated fabric was dried after each application by passing through a heated zone.

The primed fabric described above was calender coated on each side with the same calender composition and in the same manner as described in Example IV. The coated fabric had the following physical properties:

|  | W x F |
|---|---|
| Tensile strength (1" strip) | 85 x 80 lbs. |
| Hydrostatic resistance | 243 lbs./sq. inch |

The product was suitable for industrial gaskets.

*Example VIII*

The following composition is suitable for coating any of the non-woven fabric substrates described above or those described in copending application S. N. 232,245, filed June 18, 1951, by J. A. Piccard, now U. S. Patent 2,676,128.

|  | Parts by weight |
|---|---|
| Chlorosulfonated polymer of ethylene | 100.0 |
| Hydrogenated rosin | 2.5 |
| Calcium carbonate | 80.0 |
| Polyoxyethylene glycol | 3.0 |
| Carbon black | 5.0 |
| Magnesium oxide | 12.0 |
| Tetrone A — Dipentamethylene-thiuram-tetrasulfide | 1.0 |

The chlorosulfonated polymer of ethylene may be prepared in accordance with the teaching of U. S. Patent 2,212,786, issued August 27, 1940, to D. M. McQueen.

The above composition is prepared by milling on a two-roll rubber mill or Banbury mixer in the same manner as employed in the manufacture of rubber calender coating compositions. The hot plastic mass is transferred from the two-roll rubber mill or other mixer to the calender rolls where it is calendered onto the surface of the non-woven fabric.

The non-woven fabrics coated with the above composition are useful where outdoor exposure and rough usage is encountered as in the case of lawn furniture and cushions on boat decks.

*Example IX*

A non-woven fabric prepared in accordance with Example II was further processed by calendering the following composition onto the fabric:

|  | Parts by weight |
|---|---|
| Copolymer of 95 vinyl chloride and 5 vinyl acetate | 100.0 |
| Dioctyl phthalate | 63.0 |
| Camel wite (calcium carbonate) | 15.0 |
| Colored pigments | 5.0 |
| Lead stearate | 1.2 |
| Heat stabilizer (coprecipitate of lead ortho silicate and silicagel) | 4.0 |

The above composition was colloided on a two-roll rubber mill and then transferred to a four-roll calender where it was calendered on the non-woven fabric substrate in a manner well known in the coated fabric art. The calender rolls were set to produce a 12 mil film (without substrate) and the weight of the substrate with adherent film was 18.3 ounces/square yard. The calender coated non-woven fabric was embossed between heated platens, one of which was steel and had a design engraved on its surface, at a pressure of 600 tons, 300° F. temperature and a dwell of 10 seconds.

A portion of the same coating composition described above was calendered onto a woven cotton sateen fabric running 1.12 yards per pound per 53" width (9.7 ounces per square yard). As in the case of the non-woven fabric, the calender rolls were set to produce a film 12 mils thick and weighing approximately 10.0 ounces per square yard. The calender coated woven fabric was embossed in the same manner as the calender coated non-woven fabric described above. The non-woven and woven substrates as well as the coated non-woven and woven substrates were tested for tear strength and percent elongation and the following results were obtained.

|  | Non-Woven Fabric | | Woven Fabric | |
|---|---|---|---|---|
|  | Uncoated | Coated | Uncoated | Coated |
|  | W x F | W x F | W x F | W x F |
| Tongue Tear lbs. | 27 x 31 | 29 x 24 | 9.4 x 10 | 7.7 x 7.0 |
| Percent Elongation to Breaking Point | 75 x 80 | 75 x 95 | 18 x 14 | 13 x 20 |

The above data clearly show the advantages of a coated fabric employing the non-woven fabric substrate over a coated fabric employing a woven cotton fabric of equal weight. The greater distensibility of the coated non-woven fabric is of particular value for upholstery, luggage, case covering and other uses where it is necessary to stretch the coated fabric over an article or frame having sharp or curved edges and corners. The greater tear strength of the non-woven fabric is a very important property where it is used as the substrate for flexible coatings in the manufacture of upholstery materials.

In the preparation of the substrate it is important that the structural fibers not develop any adhesiveness at the temperature at which the binder is rendered adhesive. The copolyesters described above have a fusion temperature of 300–400° F. They do not have a true melting point in the ordinary sense of the word. The temperature at which adhesiveness develops depends more or less on the degree of crystallinity of the polymer and is lower than the fusion temperature. The preferred polyester binder containing 60 parts of ethylene glycol terephthalate and 40 parts ethylene glycol sebacate has a fusion temperature of approximately 320° F. although adhesiveness develops at a lower temperature. The invention is not to be limited to the particular temperature range mentioned above for the fusion temperature of the copolyester binder. The important thing is that the binder develops adhesiveness at about 50° F. lower than the structural fiber. The fusion temperature is not to be confused with the temperature at which adhesiveness develops. When a thermoplastic fiber is used as the structural fiber it must not lose its identity as a fiber during the processing. Nylon is particularly preferred as the structural fiber in view of its relatively high melting point (approximately 482° F.) and high tensile and tear strengths. The wide difference in temperature at which adhesiveness is developed in the nylon polymer and the copolyesters provides a safe operating range in preparing the non-woven fabric substrate.

It is also possible to improve the adhesiveness of the binding fiber by treating the matted felt after the compacting operation with a volatile liquid which renders the binding fiber cementitious.

The copolyesters and melt-blend of polyesters and copolyesters described above are particularly useful for the purpose of preparing the non-woven fabric substrate in view of their elastic recovery when elongated. Conventional non-woven fabrics and papers tear relatively easily when a strip is cut on one edge and the cut edges are subjected to opposing forces since the fibers are broken one at a time as the entire stress is applied to a relatively few fibers. When the non-woven fabrics employing the elastic copolyesters as the binding medium are cut on one edge and the cut edges are subjected to opposing forces the elastic fibers stretch and the stress is distributed over a greater number of fibers than in the case of conventional non-woven fabrics.

The copolyesters and melt-blended copolyesters and polyesters described in copending applications Serial No. 150,811 and Serial No. 150,812, both filed March 20, 1950, now U. S. Patents 2,623,033 and 2,623,031, respectively, when used in the form of fibers may be cold drawn, that is, permanently elongated by tensile stress in order to orient them since the oriented filaments have greater strength and elasticity. The unoriented or but slightly oriented filaments obtained by spinning under little or no stress are, however, also useful in preparing the substrates described above.

The various copolyesters described above used to form the non-woven fabric substrates may be plasticized or unplasticized. If a softer binding fiber or one which develops adhesiveness at a lower temperature is desired it may be plasticized with an aryl sulfonamide, such as toluene sulfonamide or amylbenzene sulfonamide.

The proportion of thermoadhesive binder to the non-thermoadhesive fiber used in the examples illustrate the preferred proportions. Where very soft fluffy substrates are desired the binder may represent as little as 10% of the total and when very stiff and boardy felts are desired the binder may represent as high as 65% of the total.

The time, temperature and pressure used in preparing the substrates may vary depending upon the nature of the thermoadhesive or binding fiber, particularly its softening point, and on the nature of the structural or non-thermoadhesive fibers present. For example, if a high melting filament is used as the binding fiber a relatively higher temperature and pressure will be required than if a low melting filament is used. Likewise, if a soft fabric is desired a lower pressure and/or temperature will be used than if a hard fabric is desired. Also, at higher pressures lower temperatures may be employed.

The non-woven fabric substrates described above can be dyed by the usual methods either by application of the dye to the formed felt or to the fibers before carding.

The denier of the filaments which may be used in preparing the substrates may vary depending on the type and appearance of the non-woven fabric desired. While the three denier filament is preferred, filaments having a denier of one or less may be used. Fibers having a denier of 50 to 70 produce useful non-woven fabrics and where extremely coarse felt is desired, even coarser filaments having a denier of 100 to 150 may be used. The thermoadhesive binding filament and the non-thermoadhesive structural fiber may be straight or crimped.

The coated non-woven fabric disclosed in this invention, depending upon the particular fibers used and upon the conditions of treatment, possess a wide range of properties which adapt the product for a wide variety of uses. A specific use for the coated non-woven fabric disclosed above is for the manufacture of pressure sensitive adhesive tape in which case a pressure sensitive adhesive is applied on the uncoated side of the coated non-woven fabric.

In addition to the coatings described in the specific examples the non-woven fabrics described above may be coated with compositions based on ethyl cellulose, cellulose acetobutyrate, cellulose acetopropionate, polyvinyl acetals, polyalkyl acrylic and methacrylic acid esters, amino aldehyde resins, and alkyd resins. Also in addition to the neoprene and chlorosulfonated polymer of ethylene, other elastomeric coatings such as the various synthetic rubbers based on butadiene polymers and copolymers are particularly suited for the coating of the non-woven substrates which in themselves are elastic.

The flexible coatings may be applied to either or both sides of the non-woven fabric. The absence of a weave pattern in the non-woven fabric makes it particularly useful as a substrate for flexible coatings where a fabric weave pattern is objectionable.

It is apparent that many widely different embodiments of this invention may be made without departing from the spirit and scope thereof and, therefore, it is not intended to be limited except as indicated in the appended claims.

I claim:

1. A coated non-woven flexible fabric that may be elongated without breaking and has a high tear strength, which comprises a substrate of compacted structural staple fibers in the form of a batt, said fibers being selected from the group consisting of cotton, nylon, viscose rayon, cellulose acetate, polyethylene terephthalate, polymers of acrylonitrile and wool, bound together by a binding material distributed throughout said batt comprising a linear copolyester of (a) at least one polyester of polymethylene glycol and an acyclic dicarboxylic acid of the formula $$HOOC-CH_2XCH_2-COOH$$

wherein X is a linear chain composed of 4 to 9 atoms, in the chain of which not more than 3 may be oxygen atoms and the remaining are hydrocarbon carbon atoms, any two such oxygen atoms being separated by at least two such carbon atoms, the hydrocarbon carbon atoms being saturated and containing a total of not more than three hydrocarbon carbon atoms as side chain substituents, with (b) at least one polyester of a polymethylene glycol and a symmetrical aromatic dibasic acid from the group consisting of terephthalic acid, dibenzoic acid, ehtylene bis p-oxy-benzoic acid, tetramethylene bis p-oxy-benzoic acid, and 2,6-naphthalic acid, the aromatic acid reactant comprising from 30% to 70% by weight of the total acid reacted with the polymethylene glycol, the polymethylene glycol reactant of (a) and (b) having from 2 to 6 carbon atoms and a flexible adherent surface coating comprising a film-forming material selected from the group consisting of polyvinyl chloride, copolymer of vinyl chloride and vinyl acetate, neoprene, nitrocellulose and chlorosulfonated polymer of ethylene on said substrate.

2. The product of claim 1 in which the aromatic acid comprises from 55-65% by weight of the total acid reacted with polymethylene glycol.

3. The product of claim 1 in which the binder is a copolyester of 40 parts by weight of ethylene glycol sebacate and 60 parts by weight of ethylene glycol terephthalate.

4. The product of claim 1 in which the structural fiber is nylon and the binder is a copolyester of 40 parts by weight of ethylene glycol sebacate and 60 parts of ethylene glycol terephthalate.

5. The product of claim 1 in which the flexible coating comprises polyvinyl chloride.

6. The product of claim 1 in which the flexible coating comprises neoprene.

7. The product of claim 1 in which the flexible coating comprises nitrocellulose.

8. The product of claim 1 in which the flexible coating comprises chlorosulfonated polymer of ethylene.

9. The product of claim 1 in which the flexible coating comprises a copolymer of vinyl chloride and vinyl acetate.

10. The process of preparing coated non-woven fabrics which comprises matting staple fibers selected from the group consisting of cotton, nylon, viscose rayon, cellulose acetate, polyethylene terephthalate, polymers of acrylonitrile and wool, distributing throughout with said matted staple fibers a binder comprising a linear copolyester of (a) at least one polyester of a polymethylene glycol and an acyclic dicarboxylic acid of the formula

HOOC—CH$_2$XCH$_2$—COOH wherein X is a linear chain composed of 4 to 9 atoms, in the chain of which not more than 3 may be oxygen atoms and the remaining are hydrocarbon carbon atoms, any two such oxygen atoms being separated by at least two such carbon atoms, the hydrocarbon carbon atoms being saturated and containing a total of not more than three hydrocarbon carbon atoms as side chain substituents, with (b) at least one polyester of polymethylene glycol and a symmetrical aromatic dibasic acid from the group consisting of terephthalic acid, bibenzoic acid, ethylene bis p-oxy-benzoic acid, tetramethylene bis-p-oxybenzoic acid, and 2,6-naphthalic acid, the aromatic acid reactant comprising from 30% to 70% by weight of the total acid reacted with the polymethylene glycol, the polymethylene glycol reactant of (a) and (b) having from 2 to 6 carbon atoms, subjecting the mat and binder to heat and pressure sufficient to activate the adhesiveness of the copolyester and applying a flexible adherent surface coating comprising a film-forming material selected from the group consisting of polyvinyl chloride, copolymer of vinyl chloride and vinyl acetate, neoprene, nitrocellulose and chlorosulfonated polymer of ethylene to said matted fibers.

11. The process of claim 10 in which the flexible adherent coating comprises polyvinyl chloride.

12. The process of claim 10 in which the flexible adherent coating comprises neoprene.

13. The process of claim 10 in which the flexible adherent coating comprises chlorosulfonated polymer of ethylene.

14. The process of claim 10 in which the flexible adherent coating comprises a copolymer of vinyl chloride and vinyl acetate.

References Cited in the file of this patent

UNITED STATES PATENTS

| | | |
|---|---|---|
| 2,437,046 | Rothrock | Mar. 2, 1948 |
| 2,453,052 | Van Etten | Nov. 2, 1948 |
| 2,496,665 | Hermanson | Feb. 7, 1950 |
| 2,623,031 | Snyder | Dec. 23, 1952 |